United States Patent [19]
Piasecki et al.

[11] Patent Number: 5,088,107
[45] Date of Patent: Feb. 11, 1992

[54] LINEAR CHANNEL BANDWIDTH CALIBRATION CIRCUIT

[75] Inventors: Douglas S. Piasecki, Austin; Eric J. Swanson, Buda, both of Tex.

[73] Assignee: Crystal Semiconductor, Austin, Tex.

[21] Appl. No.: 429,225

[22] Filed: Oct. 27, 1989

[51] Int. Cl.$^5$ .................. H04L 27/06; H04B 01/14
[52] U.S. Cl. .................. 375/10; 455/266; 331/59; 375/75
[58] Field of Search .................. 375/10, 75; 455/266, 455/340, 226; 331/59; 330/2

[56] References Cited

U.S. PATENT DOCUMENTS 4,792,993  10/1988  Ma .................. 455/339 X

Primary Examiner—Benedict V. Safourek
Assistant Examiner—Tesfalbet Bocure
Attorney, Agent, or Firm—Gregory M. Howison

[57] ABSTRACT

A calibration circuit for a linear channel of an optical modem includes circuitry interconnected to the linear channel for causing the linear channel to oscillate. Circuitry is interconnected to the output of the linear channel for monitoring the bandwidth of the linear channel during oscillation and for generating output pulses. The output pulses are counted and are utilized for generating an adjustment signal applied to the linear channel for adjusting the bandwidth of the linear channel.

16 Claims, 2 Drawing Sheets

LINEAR CHANNEL BANDWIDTH CALIBRATION CIRCUIT

TECHNICAL FIELD OF THE INVENTION

The present invention relates to communication systems, and more particularly, to a calibration circuit for a linear channel of an optical receiver.

BACKGROUND OF THE INVENTION

Data communication systems such as, for example, fiber optic systems utilize optical receivers for receiving data transmitted over fiber optic cables. Such optical receivers additionally provide clock recovery, encoding, decoding, and data buffering. The optical receiver may be fabricated on a single semiconductor chip.

The optical receiver typically includes an analog receiver circuit which receives an input current signal from a diode disposed to receive the signals transmitted along the fiber optic cable. Typically, for digital transmission, the receiver includes a transimpedance preamplifier and a linear channel composed of one or more postamplifiers. The output of the linear channel is applied to a comparator decision circuit which generates a digital signal representing the received data. Typically, the preamplifier has an inherently wide noise bandwidth. Conventionally, the linear channel is utilized to filter this input noise. By selecting a particular bandwidth for the linear channel, this input noise can be suppressed. However, a problem exists in that the linear channel bandwidth will change considerably with manufacturing processes and temperature variations of the receiver. A bandwidth which is too large will allow spurious noise signals to pass through the linear channel causing data or phase errors. Conversely, a bandwidth which is too small will prevent data from being received by the receiver. Therefore, the linear channel ideally should be bandwidth calibrated for proper operation of the receiver circuit.

Although methods have been previously devised for calibrating the linear channel, such as or by external testing and trimming components, such methods by themselves have been deficient and do not provide automatic bandwidth control of the linear channel.

A need has thus arisen for a linear channel bandwidth calibration circuit for the automatic and accurate control of the bandwidth of the linear channel.

SUMMARY OF THE INVENTION

In accordance with the present invention, a calibration circuit for a linear channel of an optical receiver is provided. Circuitry is interconnected to the linear channel for causing the linear channel to oscillate. Circuitry is interconnected to the output of the linear channel for monitoring the frequency of oscillation and for generating output pulses. The output pulses are counted and are utilized for generating an adjustment signal applied to the linear channel for adjusting the bandwidth of the linear channel.

BRIEF DESCRIPTION OF THE DRAWINGS

For a more complete understanding of the present invention and for further advantages thereof, reference is now made to the following Description of the Preferred Embodiments taken in conjunction with the accompanying Drawings in which.

DESCRIPTION OF THE PREFERRED EMBODIMENTS

Figure 1:
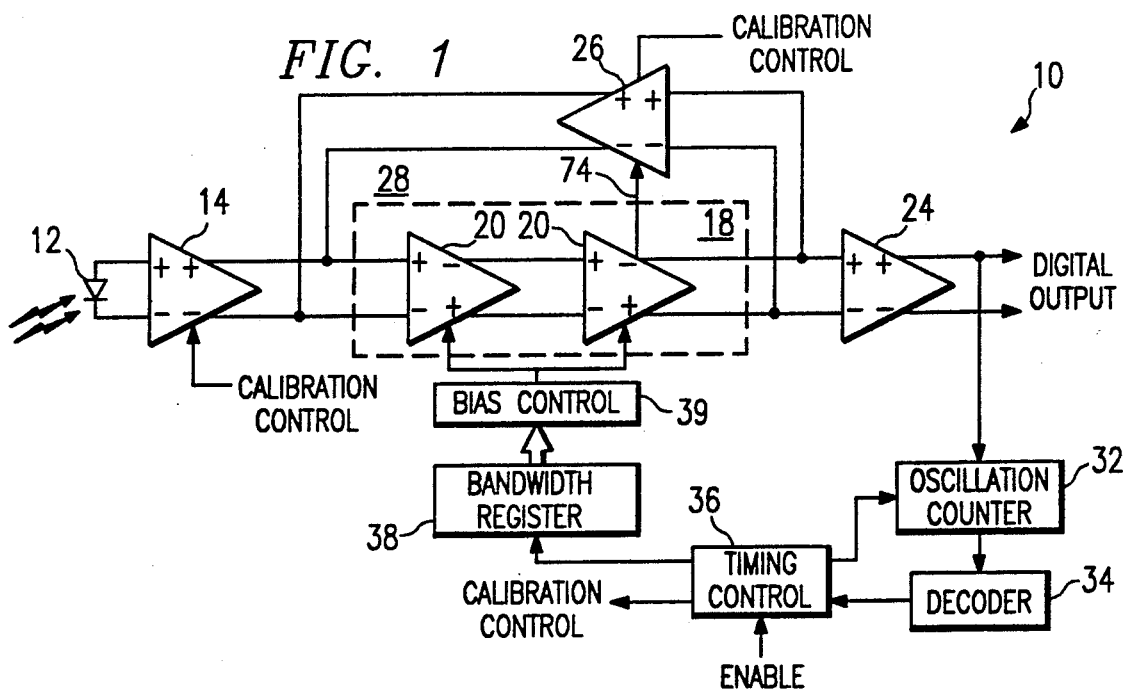
FIG. 1 is a block diagram of a portion of an optical receiver utilizing the present bandwidth calibration circuit.

Referring to FIG. 1, a portion of an optical receiver is illustrated, and is generally identified by the numeral 10. Receiver 10 provides filtering, encoding, decoding, and data buffering in a communication system utilizing fiber optic cable. An input current signal received from the fiber optic cable is sensed by a receiving diode 12 whose output is applied to a preamplifier 14. Preamplifier 14 constitutes a transimpedance preamplifier for converting the input current to a voltage. The output of preamplifier 14 is applied to a linear channel 18 which functions to amplify and band limit the preamplifier 14 output voltage. Linear channel 18 includes a pair of postamplifiers 20. Although two postamplifiers 20 are illustrated in FIG. 1, linear channel 18 may include a single postamplifier or additional postamplifiers due to design criteria. The output of linear channel 18 is applied to a comparator 24 which functions to shape a digital output signal which is applied to the remaining circuitry of the optical receiver 10.

An important aspect of the present invention is the automatic calibration of the bandwidth of linear channel 18 utilizing a calibration amplifier 26 which receives the output of linear channel 18 and in turn applies the output of calibration amplifier 26 to the input of linear channel 18. Postamplifiers 20 and calibration amplifier 26 form a negative feedback loop 28. Feedback loop 28 will oscillate if the loop gain is greater than 1 when the loop phase shift is 180°. Calibration amplifier 26 is designed as a low pass filter with its dominant pole placed low enough such that calibration amplifier 26 provides 90° of phase shift for frequencies of interest. In order for loop 28 to oscillate, postamplifiers 20 must provide an additional 90° of phase shift, 45° per each postamplifier 20, since they are identical circuits. If the gain of loop 28 is greater than unity, the circuit will oscillate at the frequency where the postamplifiers 20 each provide for 45° of phase shift. Assuming each postamplifier 20 is a single pole circuit at the desired frequencies, then operation at a 45° phase shift is at the postamplifier 20 −3dB point, which is referred to as the postamplifier 20 bandwidth. Postamplifiers 20 thereby provide the filtering to control the bandwidth of linear channel 18. The postamplifier 20 bandwidth may be selected as, for example, ninety five percent of the data rate. The resulting −3dB bandwidth of the complete linear channel will then approximate two thirds of the data rate.

The bandwidth of postamplifiers 20 is controlled by monitoring the output of comparator 24 when calibration amplifier 26 is enabled by a calibration control signal to cause feedback loop 28 to oscillate. The output of comparator 24 is applied to an oscillation counter 32 whose output is supplied to a decoder circuit 34. Decoder circuit 34 generates an output which is applied to a timing and control circuit 36 whose output is applied to a bandwidth register 38. The output of bandwidth register 38 is input to a bias control circuit 39 varying, the bias control circuit for the bias current in postamplifiers 20 and thus adjusting the bandwidth thereof. Bandwidth register 38 may comprise, for example, a 5-bit counter, which generates a digital signal that is decoded by bias control circuit 39 to control the bias current applied to postamplifiers 20 thereby controlling the bandwidth of postamplifiers 20.

Timing and control circuit 36 receives an enable signal upon power up or reset of optical receiver 10 and generates the calibration control signal. The calibration control signal is applied to calibration amplifier 26 thereby enabling this amplifier and further is applied to preamplifier 14 in order to disable preamplifier 14. When present, the calibration control signal thereby causes linear channel 18 to generate an oscillation signal in negative feedback loop 28. Timing and control circuit 36 further generates a signal to enable oscillation counter 32.

During the calibration mode, comparator 24 converts the oscillations of linear channel 18 to digital pulses which are counted by oscillation counter 32. Timing and control circuit 36 provides for a specified period of time in which the output digital pulses are to be counted by counter 32. After a predetermined number of counts have been counted by oscillation counter 32, decoder 34 generates an output signal to timing and control circuit 36 which will then apply an output to increment bandwidth register 38. This incrementing of register 38 results in bias control circuit 39 decreasing the bias current applied to postamplifiers 20, resulting in a lower bandwidth for linear channel 18 in subsequent oscillation counting periods. The bandwidth of linear channel 18 is selected to be sufficiently large and is adjusted down until the proper operating frequency is obtained. However, the reverse can also apply. The oscillation frequency of feedback loop 28 can be calculated since the period of time over which oscillation counter 32 counts is a known value.

Decoder circuit 34 is designed to trigger when the number of oscillation pulses received from the comparator 24 is larger than a desired value, as set by the time period over which the oscillation counter 32 counts and the desired overall bandwidth of linear channel 18. After the counting period has been completed, an evaluation cycle is performed. If decoder 34 was triggered during the counting period, then linear channel 18 has been oscillating too fast, which indicates a larger bandwidth than is desired. Bandwidth register 38 is incremented, thereby effectively decreasing the bandwidth of post amplifiers 20 and another counting period is entered by oscillation counter 32. This process is continued until the bandwidth of post amplifiers 20 is decreased sufficiently such that decoder 34 is not triggered during a counting period. If a sufficient count is not reached by oscillation counter 32, decoder circuit 34 is not triggered and the state of bandwidth register 38 is stored and the calibration process is ended.

Figure 2:
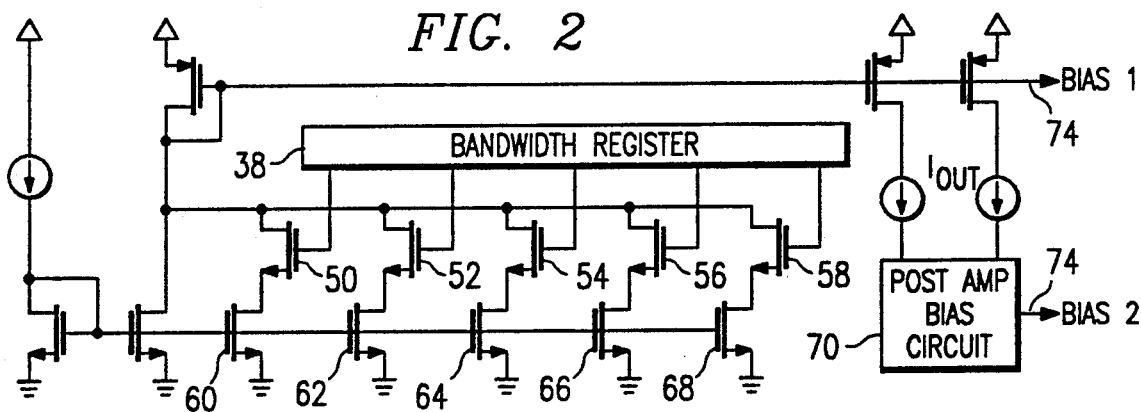
FIG. 2 is a schematic diagram of a portion of a post-amplifier shown in FIG. 1.

Referring to FIG. 2, bandwidth control of postamplifiers 20 is accomplished by switching out binary weighted current mirror transistors within bias control circuit 39. Postamplifiers 20 may include, for example, 32 bandwidth increments available for controlling the bias current of postamplifiers 20. The switches within bias control circuit 39 may be initially all on to provide the maximum current, and maximum bandwidth, and are then switched off as the count within bandwidth register 38 is incremented. With all the switches in bias control circuit 39 off, the minimum linear bandwidth is achieved.

FIG. 2 illustrates a partial schematic diagram of the bias control circuit 39. The outputs of bandwidth register 38 (FIG. 1) are applied to the gates of transistors 50, 52, 54, 56 and 58, respectively. Transistors 50-58 are interconnected to transistors 60, 62, 64, 66 and 68, respectively. Bandwidth control within a postamplifier 20 is accomplished by switching out transistors 60-68 via transistors 50-58, respectively, in bias control circuit 39. Transistors 50-58 initially are in the on state which provides the maximum current, and maximum bandwidth, and are switched off as bandwidth register 38 is updated. Switch 50 represents the least significant bit of bandwidth register 38. With all transistors 50-58 off, the minimum postamplifier 20 bandwidth is achieved. The state of transistors 50-58 controls the Bias 1 output and, through a postamplifier bias circuit 70, controls the Bias 2 output available to postamplifier 20.

Calibration amplifier 26 is a low pass filter with a $-3dB$ frequency far below the data rate. Although the phase shift of the amplifier is approximately 90°, the attenuation increases at 20dB per decade. This attenuation limits how low in frequency the calibration pole can be placed, since a value too low would make the loop gain of feedback loop 28 too small to allow oscillation. On the other hand, placing the pole too high would introduce phase error for lower bandwidth of postamplifiers 20, because 90° phase shift is not attained at oscillation. Therefore, calibration amplifier 26 utilizes a sliding pole which is controlled by the output bias current of postamplifiers 20 via signal line 74 (FIG. 1). The transconductance of the transistors within the calibration amplifier 26 along with an internal capacitor are chosen to provide a properly placed pole which matches process and temperature variations with that of postamplifier 20. The pole location of calibration amplifier 26 will slide down as the postamplifier 20 output current value is decremented during the calibration process. Thus, the phase shift and attenuation change of calibration amplifier 26 relative to the bandwidth of postamplifiers 20 is reduced as the bandwidth of postamplifiers 20 is decreased.

Figure 3:
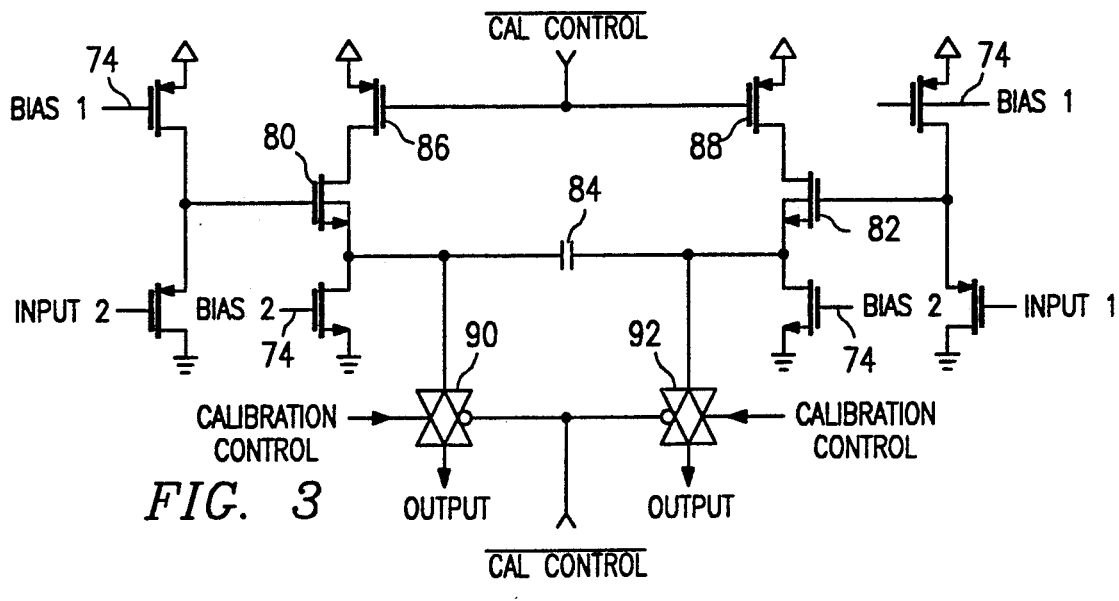
FIG. 3 is a schematic diagram of a portion of the calibration amplifier shown in FIG. 1.

FIG. 3 illustrates a portion of calibration control amplifier 26. Calibration control amplifier 26 includes differential transistors 80, 82 and a capacitor 84 between the sources thereof. The inverse of the calibration control signal is applied to load transistors 86 and 88, which are connected between the drains of transistors 80 and 82 and the supply voltage, as well as to the control inputs of switches 90 and 92. Switches 90 and 92 are connected between the sources of transistors 80 and 82, respectively, and the output and generate the output of calibration control amplifier 26, when enabled by the calibration control signal. When present, the calibration control signal actuates calibration amplifier 26 to generate its output for application to linear channel 18. The transconductance of transistors 80 and 82 together with capacitor 84 are chosen to provide a properly placed pole which matches process and temperature variations with that of postamplifiers 20. As previously stated, the sliding pole of calibration control circuit 26 is controlled by the postamplifier 20 via current $I_{out}$, bias 1 and bias 2 along signal line 74.

Figure 4:
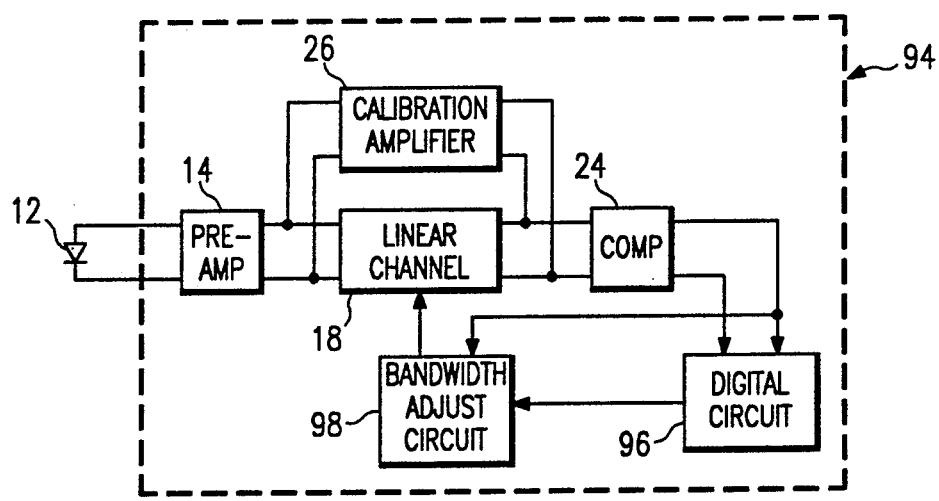
FIG. 4 is a block diagram of an integrated circuit utilizing the present bandwidth calibration circuit.

Referring now to FIG. 4, there is illustrated a block diagram of an integrated circuit utilizing the present calibration circuit. The integrated circuit is noted by reference numeral 94 and includes the preamplifier 14, linear channel 18 and comparator 24 and calibration amplifier 26. The output of the comparator 24 is input to a digital circuit 96. The digital circuit 96 contains the other functions of the optical data link such as the transmit section, the decoding section, the control and timing circuitry, etc. The bandwidth register 38, oscillation counter 32, decoder 34 and timing control circuit 36 are illustrated by bandwidth adjust circuit 98 and have been previously described with respect to FIG. 1.

In a typical integrated circuit, various reset functions are generated. These functions are utilized upon power up to set the initial conditions of the integrated circuit 94 and also for situations where errors are detected. In either of these situations, the calibration circuit of the present invention is implemented for a predetermined duration of time. However, as will be described hereinbelow, the calibration can be continuous.

Figure 5:
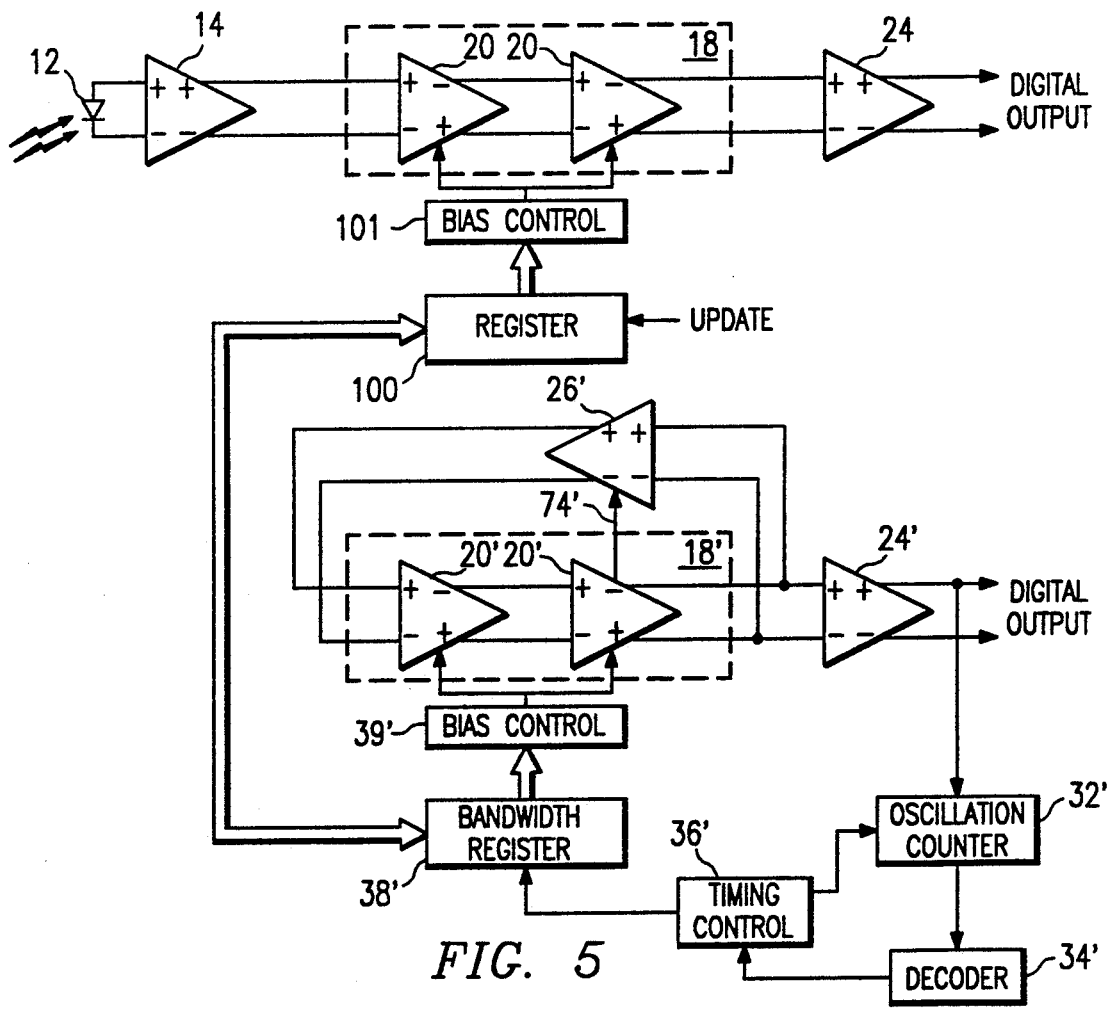
FIG. 5 is a block diagram of a portion of a receiver modem utilizing an alternate embodiment of the present bandwidth calibration circuit.

Referring now to FIG. 5, there is illustrated an alternate embodiment of the present invention. In the embodiment of FIG. 5, a separate linear channel 18' is provided which is identical to the linear channel 18. The linear channel 18 does not incorporate the calibration amplifier 26. However, the calibration amplifier 26' is provided in feedback with the linear channel 18', in an identical configuration to that described above with reference to FIG. 1.

The output of the preamplifier 14 is input to the linear channel 18. The output of linear channel 18' is input to the comparator 24', the output of which is input to the oscillation circuit 32'. A bandwidth register 38' and bias control circuit 39' are provided for controlling the bandwidth of both the linear channel amplifier 18' and linear channel 18. A timing control circuit 36' and a decoder 34' are provided and function identically to the timing control circuit 36 and the decoder 34. The operation of the calibration control for the bandwidth calibration of linear channel 18' is identical to that disclosed above with reference to FIG. 1 with the exception that the bandwidth is continually adjusted; that is, the calibration amplifier 26' is always in the oscillation mode and the calibration control on the calibration amplifier 26' is always at a high logic state.

The bias currents determined by the bandwidth register 38' and bias control circuit 39' are input to the postamplifiers 20'. The digital values stored in bandwidth register 38' are also input to an update register 100 which is operable to store a current value for input to a bias control circuit 101 that operates identical to bias control circuit 39. The output of bias control circuit 101 is input to the postamplifiers 20 in the linear channel 18. An update signal is provided from a digital circuit 96 (FIG. 4) to determine when the value stored in register 100 can be updated to those stored in the bandwidth register 38'. The register 100 provides for isolation of bandwidth control for channel 18 from bandwidth control for linear channel 18'. In this manner, the updates can be periodic so as not to make a bandwidth adjustment during normal operation of linear channel 18. Such an adjustment could introduce noise into the linear channel 18. Further, the values in the bandwidth register 39' and register 101 are compared and the update signal generated only when the difference between the two values exceeds a positive or negative threshold. This provides some hysteresis for the system.

It therefore can be seen that the present invention provides for the calibration of a linear channel within a receiver modem by converting the linear channel into an oscillator. The output of the linear channel during oscillation is monitored and the bandwidth of the linear channel adjusted based upon the output of the linear channel. The present invention provides for an automatic calibration of the linear channel during the power-up or reset of the optical receiver by adjusting the bandwidth of postamplifiers until the desired overall linear channel bandwidth is achieved.

Whereas the present invention has been described with respect to specific embodiments thereof, it will be understood that various changes and modifications will be suggested to one skilled in the art and it is intended to encompass such changes and modifications as fall within the scope of the appended claims.

What is claimed is:

1. A calibration circuit for a linear channel of a data receiver, the linear channel having a finite bandwidth, an input and an output, comprising:
   means interconnected to the linear channel for causing the linear channel to operate in an oscillation mode and oscillate at an oscillation frequency;
   means interconnected to the output of the linear channel for monitoring the oscillation frequency of the linear channel during the oscillation mode;
   means for correlating the monitored oscillation frequency to the bandwidth of the linear channel such that the bandwidth of the linear channel bears a relationship to the oscillation frequency; and
   means responsive to said monitoring means and correlating means for determining if the bandwidth of the linear channel deviates from a desired bandwidth, and for adjusting the bandwidth of the linear channel from the determined bandwidth to a new bandwidth when the determined bandwidth deviates from the desired bandwidth.

2. The calibration circuit of claim 1 wherein said means interconnected to the linear channel for causing the linear channel to oscillate includes:
   an amplifier connected in feedback with the linear channel for introducing a predetermined phase shift in the output signal of the linear channel, thereby forming a negative feedback loop.

3. The calibration circuit of claim 1 wherein said monitoring means and said correlation means include:
   means for generating output pulses from said monitoring means, said output pulses having a frequency of occurrence proportional to the oscillation frequency;
   means for counting the output pulses for a predetermined period of time; and
   means for altering the bandwidth of the linear channel when a predetermined number of output pulses is counted during the predetermined period of time.

4. The calibration circuit of claim 2 wherein said amplifier and the linear channel are fabricated on a single semiconductor chip.

5. A method for calibrating the bandwidth of a linear channel in an integrated circuit receiver, comprising:
   determining the bandwidth of the linear channel;
   comparing the determined bandwidth of the linear channel with a predetermined bandwidth reference to determined a bandwidth error, the bandwidth error being the difference between a desired bandwidth and the determined bandwidth; and automatically adjusting the bandwidth of the linear channel to minimize the bandwidth error when a bandwidth error exists.

6. The method of claim 5 wherein the step of determining the bandwidth of the linear channel comprises:
   causing the linear channel to oscillate at an oscillation frequency that corresponds to the actual bandwidth of the linear channel;
   correlating the oscillation frequency to the bandwidth of the linear channel, such that the bandwidth of the linear channel bears a relationship to the oscillation frequency, the correlated oscillation frequency corresponding to the bandwidth of the linear channel.

7. The method of claim 5 wherein the step of determining the bandwidth of the linear channel comprises selectively providing feedback between the output and the input of the linear channel to cause the linear channel to oscillate, the oscillation frequency corresponding to the bandwidth of the linear channel by a predetermined relationship; and
   measuring the oscillation frequency and converting the measured oscillation frequency to bandwidth information in accordance with the predetermined relationship.

8. The method of claim 7 wherein the linear channel comprises a linear channel differential monolithic amplifier and the step of adjusting the bandwidth of the linear channel to minimize bandwidth error comprises:
   converting the bandwidth error to a bias current adjustment value; and
   changing the bias currents to the linear channel amplifier by the bias current adjustment value to adjust the bandwidth thereof.

9. The method of claim 5 wherein the step of determining the bandwidth of the linear channel comprises:
   providing a separate reference linear channel identical to the linear channel; and
   determining the bandwidth of the reference linear channel.

10. The method of claim 9 wherein the step of comparing the determined bandwidth of the linear channel with a predetermined bandwidth reference to determined bandwidth error comprises comparing the determined bandwidth of the reference linear channel to the predetermined bandwidth reference to determine the bandwidth of the reference linear channel and generating a reference bandwidth error, the reference bandwidth error corresponding to the bandwidth error in the linear channel.

11. The method of claim 10 wherein the step of adjusting the bandwidth of the linear channel comprises:
   adjusting the bandwidth of the reference linear channel to minimize the bandwidth error in the reference linear channel; and
   mirroring the adjustment in the reference linear channel to the linear channel such that the bandwidth adjustment of the reference linear channel corresponds to the bandwidth adjustment of the linear channel.

12. The method of claim 5 and further comprising:
   incorporating the linear channel in an integrated circuit;
   generating in the integrated circuit a calibration initiate signal when a predetermined event occurs;
   isolating the linear channel from the integrated circuit in response to generation of the calibration initiate signal;
   performing the steps of determining the bandwidth, comparing and automatically adjusting in response to generation of the calibration initiate signal; and
   reconnecting the linear channel to the integrated circuit after the bandwidth error is minimized.

13. A method of calibrating the bandwidth of a linear channel in an integrated circuit, comprising:
   isolating the input of the linear channel from driving circuitry;
   inserting a feedback path between the output and the input of the linear channel to place the linear channel in an oscillation mode, the feedback path having a phase and gain sufficient to cause oscillation of the linear channel;
   determining the oscillation frequency of the linear channel in the oscillation mode, the oscillation frequency having a predetermined relationship to the bandwidth of the linear channel;
   comparing the determined oscillation frequency with a predetermined oscillation frequency reference and then generating a bandwidth error in accordance with the predetermined relationship;
   altering the bandwidth of the linear channel in order to minimize bandwidth error;
   removing the feedback path from between the output and the input of the linear channel when the bandwidth error is minimized; and
   reconnecting the input of the linear channel to the driving circuit.

14. The method of claim 13 wherein the step of determining the oscillation frequency comprises:
   converting the oscillation output of the linear channel to a stream of output pulses having a frequency proportional to the oscillation frequency;
   providing a counter for counting the number of pulses output by the linear channel during a predetermined duration of time when in the oscillation mode, with the predetermined reference being a reference duration of time and the step of generating the bandwidth error comprising determining the count value output from the counter.

15. The method of claim 14 wherein the step of altering the bandwidth of the linear channel comprises:
   decoding the count value representing the bandwidth error;
   storing the decoded count value in a register; and
   altering the operating characteristics of the linear channel to alter the bandwidth thereof in accordance with the stored decoded count value.

16. The method of claim 15 wherein the linear channel comprises a linear channel differential monolithic amplifier and the step of altering the characteristics thereof comprises:
   applying bias currents to operate the linear channel amplifier; and
   changing the bias currents in accordance with the stored decoded count value such that updating of the stored decoded count value will alter the bandwidth thereof.

* * * * *